(12) United States Patent
Matsumoto

(10) Patent No.: US 11,894,018 B1
(45) Date of Patent: Feb. 6, 2024

(54) HEAT-ASSISTED MAGNETIC RECORDING (HAMR) HEAD WITH MAIN POLE HAVING NARROW PLASMONIC RECESS

(71) Applicant: Western Digital Technologies, Inc., San Jose, CA (US)

(72) Inventor: Takuya Matsumoto, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/821,166

(22) Filed: Aug. 20, 2022

(51) Int. Cl.
*G11B 13/08* (2006.01)
*G11B 5/00* (2006.01)

(52) U.S. Cl.
CPC ...... *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,768,556 B1 | 7/2004 | Matsumoto et al. | |
| 8,705,327 B2 | 4/2014 | Matsumoto | |
| 8,947,985 B1* | 2/2015 | Morelli | G11B 5/6088 369/13.13 |
| 10,121,496 B1 | 11/2018 | Peng et al. | |
| 10,249,333 B2 | 4/2019 | Maletzky et al. | |
| 10,468,058 B1* | 11/2019 | Bashir | G11B 5/6082 |
| 10,482,907 B1 | 11/2019 | Mani Biswas et al. | |
| 10,770,098 B1 | 9/2020 | Peng | |
| 10,811,038 B1 | 10/2020 | Peng et al. | |
| 2007/0081278 A1* | 4/2007 | Feldbaum | G11B 5/1278 |
| 2009/0201600 A1* | 8/2009 | Komura | G11B 5/102 360/59 |
| 2010/0165499 A1* | 7/2010 | Stipe | G11B 5/314 360/59 |
| 2010/0214685 A1* | 8/2010 | Seigler | G11B 5/4866 360/59 |
| 2011/0090588 A1 | 4/2011 | Gao et al. | |
| 2014/0241136 A1* | 8/2014 | Tsutsumi | G11B 5/6088 369/13.13 |
| 2015/0287425 A1 | 10/2015 | Guler et al. | |
| 2016/0329068 A1 | 11/2016 | Matsumoto et al. | |
| 2017/0243607 A1* | 8/2017 | Sasaki | G11B 5/1272 |
| 2017/0323659 A1* | 11/2017 | Matsumoto | G11B 5/3116 |
| 2019/0088273 A1 | 3/2019 | Chen et al. | |
| 2019/0198053 A1 | 6/2019 | Krichevsky et al. | |

* cited by examiner

*Primary Examiner* — Peter Vincent Agustin
(74) *Attorney, Agent, or Firm* — PATTERSON + SHERIDAN, L.L.P.; Steven H. Versteeg

(57) ABSTRACT

A heat-assisted magnetic recording (HAMR) head has a slider with a gas-bearing-surface (GBS). The slider supports a near-field transducer (NFT) with an output tip at the GBS and a main magnetic pole that has a recess in the NFT-facing surface that contains plasmonic material. The plasmonic recess has a front edge at the GBS that has a cross-track width equal to or less than the cross-track width of the widest portion of the NFT output tip, and a back edge recessed from the GBS. A thermal shunt is located between the NFT and the main pole to allow heat to be transferred away from the optical spot generated by the NFT output tip, and is in contact with a region of the plasmonic recess near the back edge.

26 Claims, 14 Drawing Sheets

HEAT-ASSISTED MAGNETIC RECORDING (HAMR) HEAD WITH MAIN POLE HAVING NARROW PLASMONIC RECESS

TECHNICAL FIELD

This invention relates generally to a heat-assisted magnetic recording (HAMR) disk drive, in which data are written while the magnetic recording layer on the disk is at an elevated temperature, and more specifically to an improved HAMR head.

BACKGROUND

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing by the main magnetic pole to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed HAMR disk drive uses a laser source and an optical waveguide coupled to a near-field transducer (NFT) for heating the recording layer on the disk. A "near-field" transducer refers to "near-field optics", wherein the passage of light is through an element with sub-wavelength features and the light is coupled to a second element, such as a substrate like a magnetic recording layer, located a sub-wavelength distance from the first element to generate a heated optical spot on the recording layer. The NFT is typically located at the gas-bearing surface (GBS) of the gas-bearing slider that also supports the read head and write head and rides or "flies" above the disk surface. The write head includes a main pole with a tip at the GBS near the NFT that directs a magnetic field to the recording layer while the NFT heats the recording layer. A thermal shunt of high thermal conductivity material is located between the NFT and the main pole to allow heat to be transferred away from the optical spot to heat sink material located on the cross-track sides of the main pole.

A NFT with a generally triangular or trapezoidal shaped output tip is described in U.S. Pat. No. 8,705,327 B2 assigned to the same assignee as this application. In this NFT an evanescent wave generated at a surface of the waveguide couples to surface plasmons excited on the surface of the NFT and a strong optical near-field is generated at the apex of the output tip.

SUMMARY

It is important that the HAMR disk has a high thermal gradient in the recording layer, meaning there is a sharp drop in temperature at the edges of the bits being recorded. It has been proposed to add a full-film layer of plasmonic material on the main pole and facing the NFT to increase the thermal gradient, as described in U.S. Pat. No. 10,121,496 B1. However, this plasmonic layer increases the gap between the NFT and the main pole, which reduces the magnetic field intensity at the recording layer. Also, the addition of the plasmonic layer increases the temperature of the NFT.

In embodiments of this invention, instead of a full film under the main pole, the main pole has a recess in its NFT-facing surface that contains plasmonic material, but a significant portion of the main pole's NFT-facing surface remains facing the NFT layer so there is no gap between this portion of the main pole and the NFT. The plasmonic material includes a plasmonic tip at the main pole output end at the GBS that is aligned with the NFT in the along-the-track direction and has a cross-track width equal to or less than the cross-track width of the NFT tip. By reducing the width of the plasmonic tip at the GBS the NFT temperature can be reduced.

The plasmonic material in the recess may extend from the plasmonic tip at the GBS to a partial or full height of the main pole and may have a cross-track width that increases or decreases in the direction away from the plasmonic tip. In an embodiment where the cross-track width of the plasmonic material increases in the direction away from the GBS, the plasmonic material may exhibit a flare angle with a curved shape. The along-the-track thickness of the plasmonic material in a region away from GBS may be the same or either less than or greater than the along-the-track thickness of the plasmonic tip at the GBS. An optional layer of dielectric material may be in the recess between the plasmonic material and the main pole. The gap material between the plasmonic tip and the NFT may be the waveguide cladding material or material chosen from a wide selection of other materials.

For a fuller understanding of the nature and advantages of the present invention, reference should be made to the following detailed description taken together with the accompanying figures.

DETAILED DESCRIPTION

Figure 1:
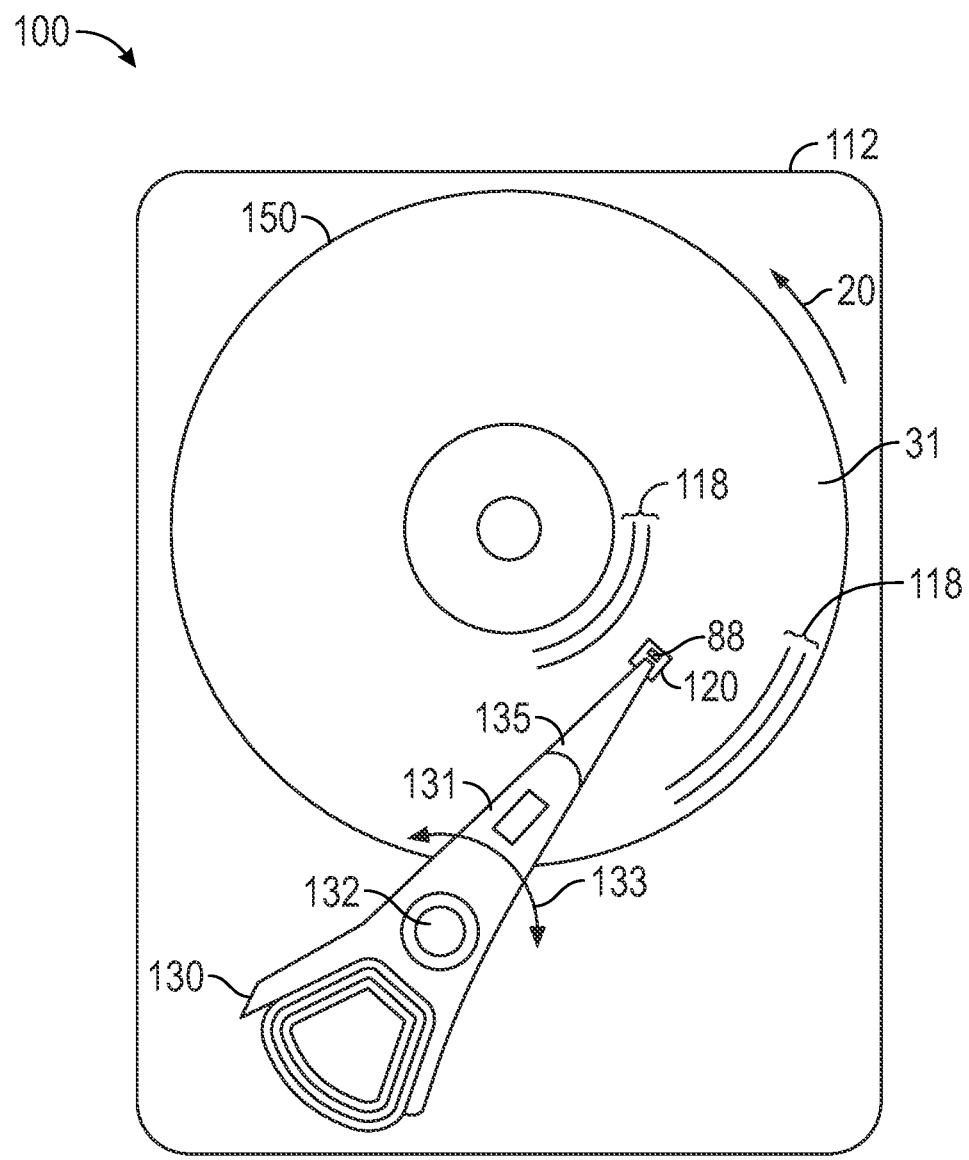
FIG. 1 is a top view of a heat-assisted magnetic recording (HAMR) disk drive according to an embodiment of the invention.

FIG. 1 is a top view of a heat-assisted recording (HAMR) disk drive 100 according to an embodiment of the invention. In FIG. 1, the HAMR disk drive 100 is depicted with a disk 150 with magnetic recording layer 31 of conventional continuous magnetic recording material arranged in radially-spaced circular tracks 118. Only a few representative tracks 118 near the inner and outer diameters of disk 150 are shown. However, instead of a conventional continuous magnetic recording layer, the recording layer may be a bit-patterned-media (BPM) layer with discrete data islands.

The drive 100 has a housing or base 112 that supports an actuator 130 and a drive motor for rotating the magnetic recording disk 150. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 150 and enables it to "pitch" and "roll" on the bearing of gas (typically air or helium) generated by the disk 150 as it rotates in the direction of arrow 20. The slider 120 supports the HAMR head (not shown), which includes a magnetoresistive read head, an inductive write head, the near-field transducer (NFT) and optical waveguide. A semiconductor laser 88 with a wavelength of 780 to 980 nm may used as the HAMR light source and is depicted as being supported on the top of slider 120. Alternatively the laser may be located on suspension 135 and coupled to slider 120 by an optical channel. As the disk 150 rotates in the direction of arrow 20, the movement of actuator 130 allows the HAMR head on the slider 120 to access different data tracks 118 on disk 150. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
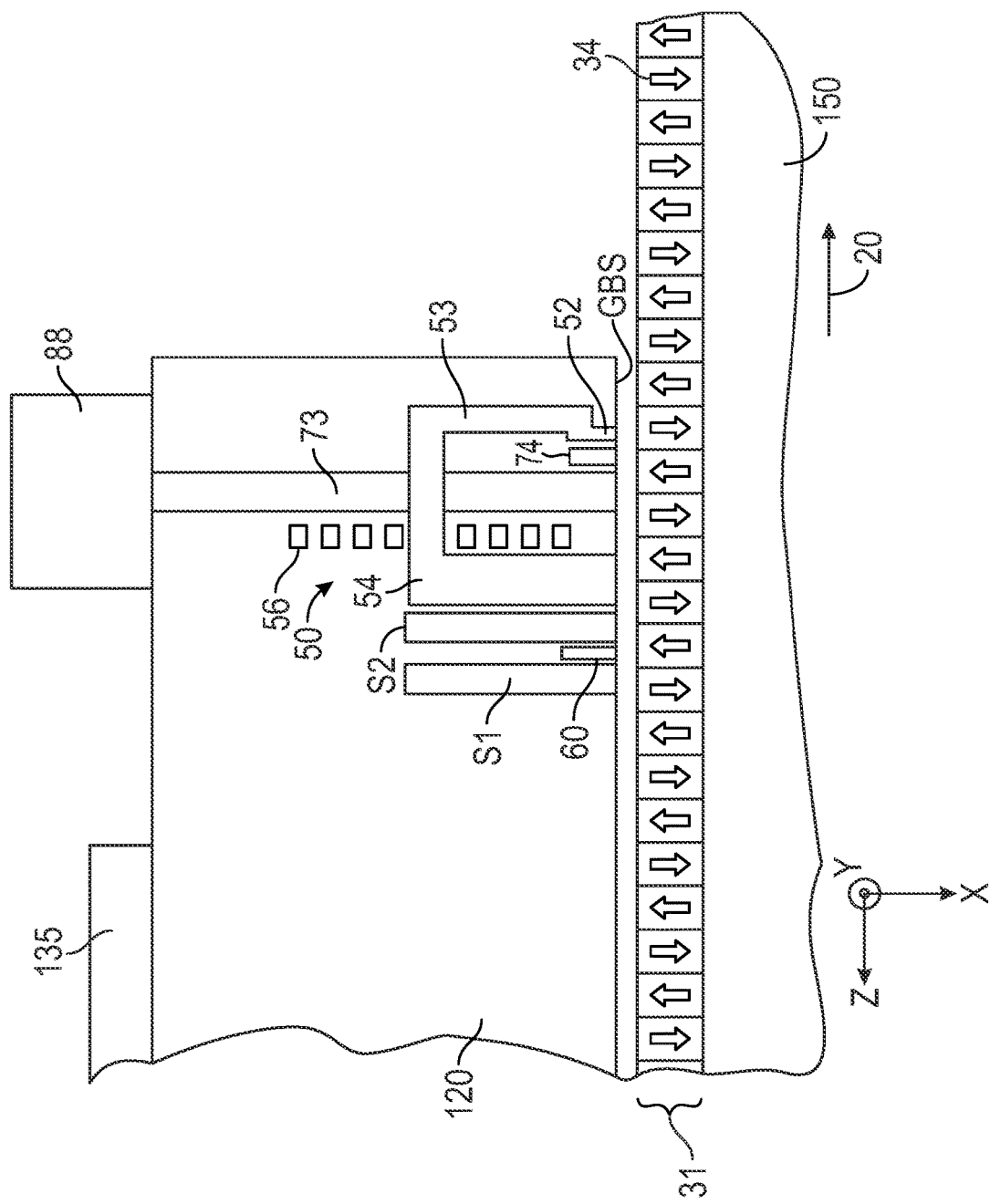
FIG. 2 is a side a sectional view, not drawn to scale because of the difficulty in showing the very small features, of a gas-bearing slider for use in a HAMR disk drive and a portion of a HAMR disk according to the prior art.

In the following drawings, the X-axis denotes an axis perpendicular to the gas-bearing surface (GBS) of the slider, the Y-axis denotes a track width or cross-track axis, and the Z-axis denotes an along-the-track axis. FIG. 2 is a schematic cross-sectional view illustrating a configuration example of a HAMR head according to the prior art. In FIG. 2, the disk 150 is depicted with the recording layer 31 being a conventional continuous magnetic recording layer of magnetizable material with magnetized regions or "bits" 34. The gas-bearing slider 120 is supported by suspension 135 and has a GBS that faces the disk 150 and supports the magnetic write head 50, read head 60, and magnetically permeable read head shields S1 and S2. A recording magnetic field is generated by the write head 50 made up of a coil 56, a primary magnetic pole 53 for transmitting flux generated by the coil 56, a main pole 52 connected to the primary pole 53, and a return magnetic pole 54 coupled to the primary pole 53 and main pole 52. A magnetic field generated by the coil 56 is transmitted through the primary pole 53 to the main pole 52 arranged in a vicinity of an optical near-field transducer (NFT) 74. FIG. 2 illustrates the write head 50 with a well-known "pancake" coil 56, wherein the coil segments lie in substantially the same plane. However, alternatively the coil may be a well-known "helical" coil wherein the coil is wrapped around the primary magnetic pole 53. At the moment of recording, the recording layer 31 of disk 150 is heated by an optical near-field generated by the NFT 74 and, at the same time, a region or "bit" 34 is magnetized and thus written onto the recording layer 31 by applying a recording magnetic field generated by the main pole 52.

A semiconductor laser 88 is mounted to the top surface of slider 120. An optical waveguide 73 for guiding light from laser 88 to the NFT 74 is formed inside the slider 120. Materials that ensure a refractive index of the waveguide 73 core material to be greater than a refractive index of the surrounding cladding material (not shown) may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $Nb_2O_5$, $SiO_xN_y$, or Ge-doped $SiO_2$ as the core material. The waveguide 73 that delivers light to NFT 74 is preferably a single-mode waveguide.

Figure 3A:
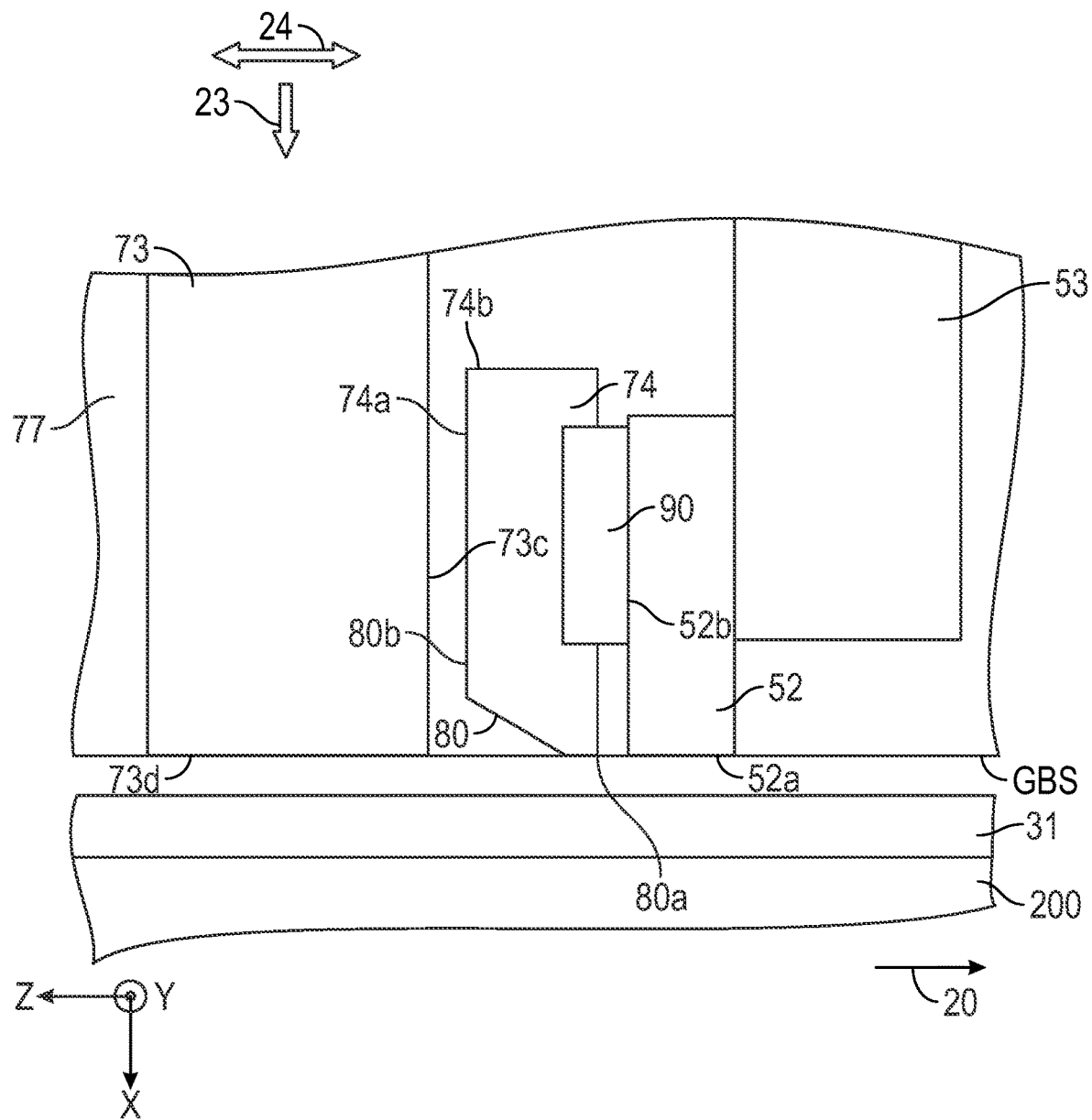
FIG. 3A is a side sectional view of the layers of material making up the main pole and primary pole, the near-field transducer (NFT) and the waveguide according to the prior art and shown in relation to the recording layer on the disk.

FIG. 3A is a side sectional view of a prior art HAMR head and shows the layers of material making up the primary pole 53, main pole 52, NFT 74 and waveguide 73 and shown in relation to disk 150 with recording layer 31. The main pole 52 is typically a layer of high-moment material like FeCo and has a pole tip 52a at the GBS and a surface 52b that faces the NFT 74. The waveguide 73 is a layer of core material generally parallel to the main pole 52 layer with a length orthogonal to the GBS and a waveguide end 73d at the GBS. The waveguide 73 has surrounding cladding material 77 and a generally planar surface 73c that faces and is parallel to NFT 74 layer. The NFT 74 layer is a conductive low-loss metal (preferably Au, but also Ag, Al, Cu, Rh, Ir or their alloys), is generally parallel to waveguide 73 layer and main pole 52 layer and is located between and spaced from the waveguide 73 layer and the main pole 52 layer. The NFT 74 layer has a surface 74a that faces and is spaced from waveguide surface 73c. The NFT 74 layer has an output tip 80 substantially at the GBS. When light is introduced into the waveguide 73, an evanescent wave is generated at the surface 73c and couples to a surface plasmon excited on the surface 74a of NFT 74. Arrow 23 shows the direction of propagation of light in waveguide 73 and arrow 24 shows the direction of polarization of the light. The surface plasmon propagates to the output tip 80. The output tip 80 has an apex 80a that faces the main pole tip 52a and a back edge 80b that faces the waveguide surface 73c. At the apex 80a an optical near-field spot is generated in the space at the GBS between the output tip apex 80a and the main pole tip 52a. The main pole tip 52a applies a magnetic field at the optical spot. A thermal shunt 90 of material with high thermal conductivity like Au, Ag or Cu may be located between NFT 74 and main pole 52 to allow heat to be transferred from the optical spot to heat-sink material located on the cross-track sides of main pole 52. A thermal shunt is described in U.S. Pat. No. 8,619,516 B1, which is assigned to the same assignee as this application.

Figure 3B:
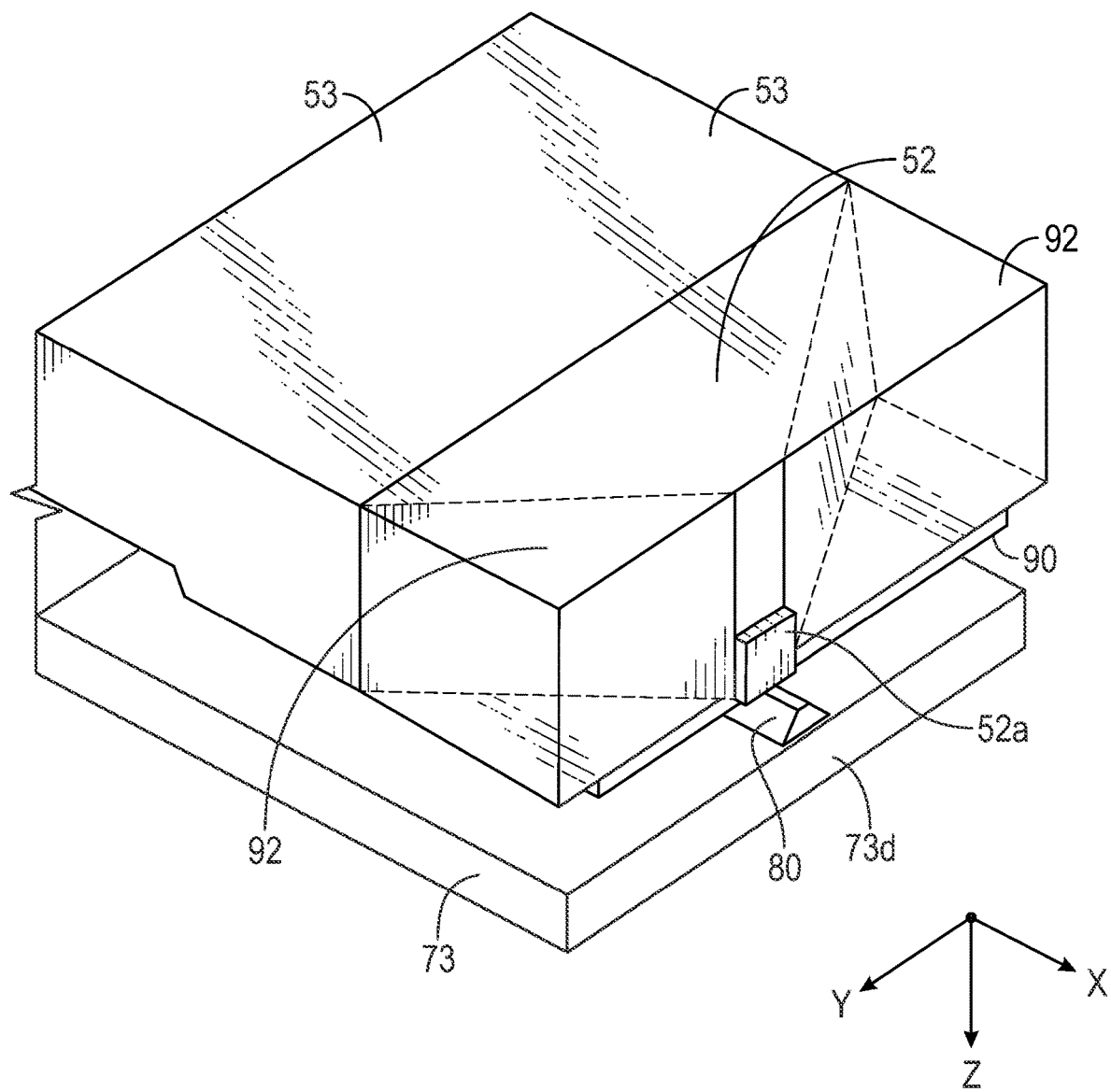
FIG. 3B is a perspective view of the main pole, primary pole, NFT, waveguide and heat-sink material on the cross-track sides of the main pole according to the prior art.

FIG. 3B is a perspective view of a prior art HAMR head and shows heat-sink material 92 in contact with thermal shunt 90, as well as the primary pole 53, the main pole 52, the NFT output tip 80 and the waveguide end 73d. Heat-sink material 92 is located on the cross-track sides of main pole 52 and connected to thermal shunt 90. If the heat-sink material 92 includes an element that may diffuse into the magnetic material of main pole 52, like Au or Cu, then a diffusion barrier layer (not shown) is located between main pole 52 and the heat-sink material 92. The material of the diffusion layer may be, for example, Rh, Ru, In, Co, W, Rh oxide, Ru oxide, Indium oxide, or TiN, with a thickness preferably in the range of 5-10 nm. If the heat-sink material 92 is selected from a material that is not likely to diffuse into the main pole 52, like Ru or Rh, then the diffusion layer is not required.

The HAMR head may include a full-film layer of plasmonic material under the main pole and facing the NFT, which has been proposed to increase the thermal gradient. However, the addition of the full-film plasmonic layer also increases the temperature of the NFT. One definition of a plasmonic material is a metal or metal alloy that has an extinction coefficient k at least twice as great as the index of refraction n at the wavelength of interest. Plasmonic materials provide excellent optical coupling with the NFT, which results in a confined heat source in the recording layer. Au, Ag and Cu are examples of plasmonic materials.

Figure 4A:
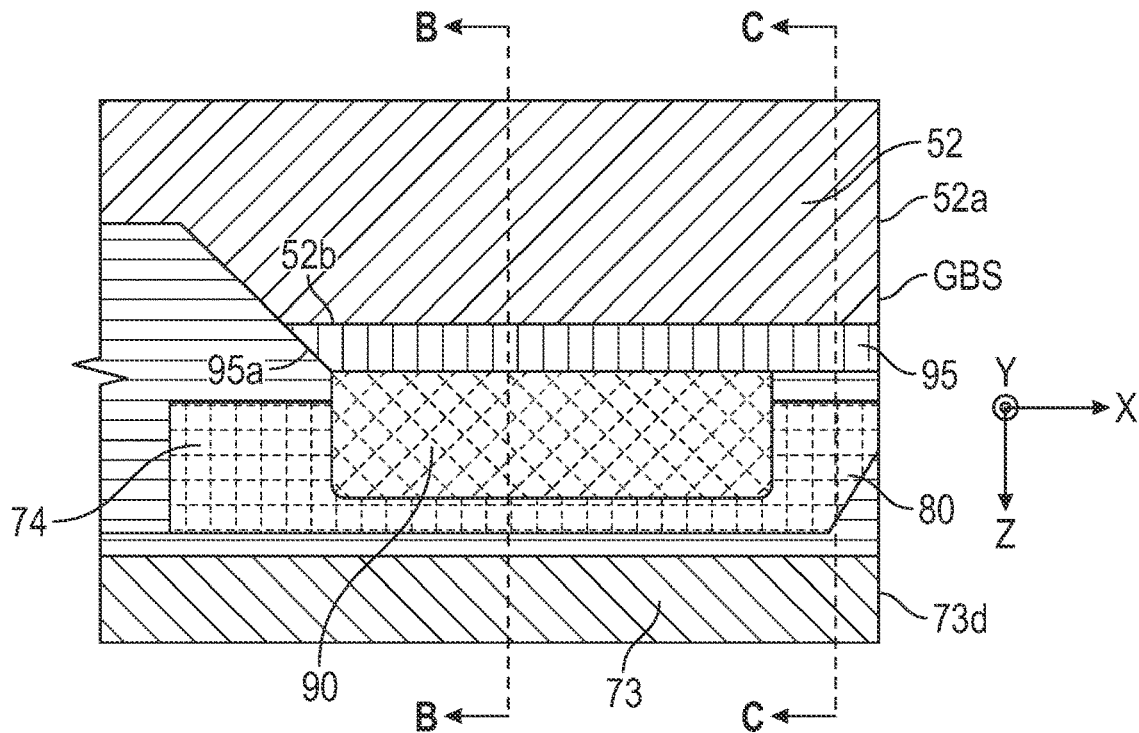
FIG. 4A is a sectional view of a HAMR head with a prior art full-film plasmonic layer on the NFT-facing surface of the main pole.
Figure 4B:
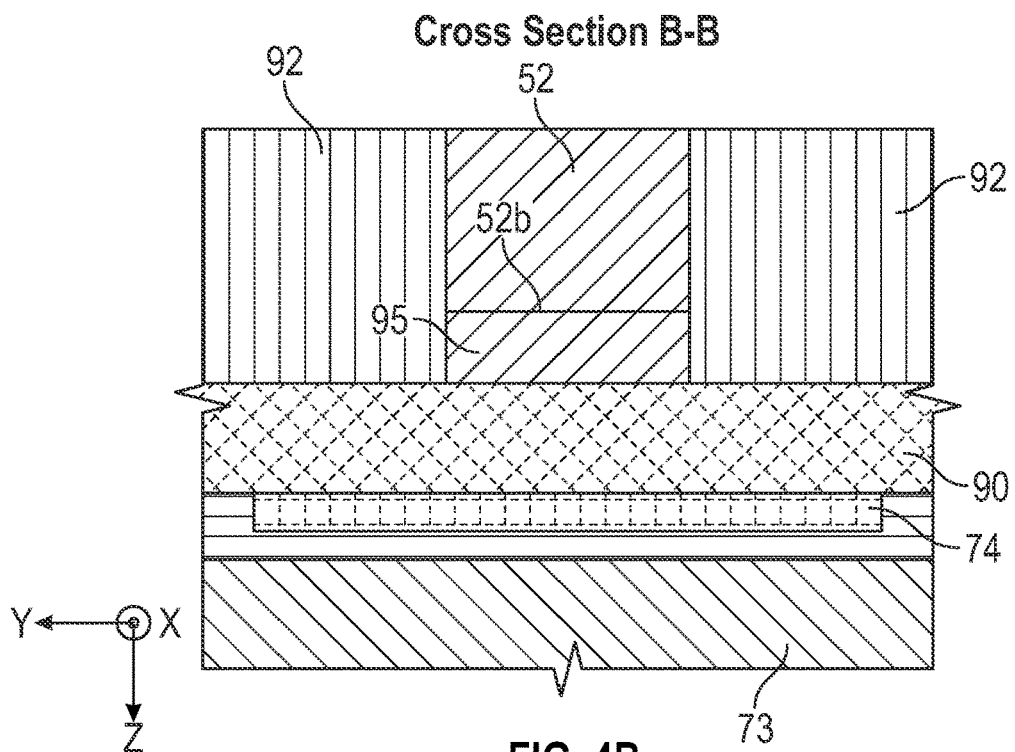
FIGS. 4B and 4C are views of sections B-B and C-C, respectively, of FIG. 4A
Figure 4C:
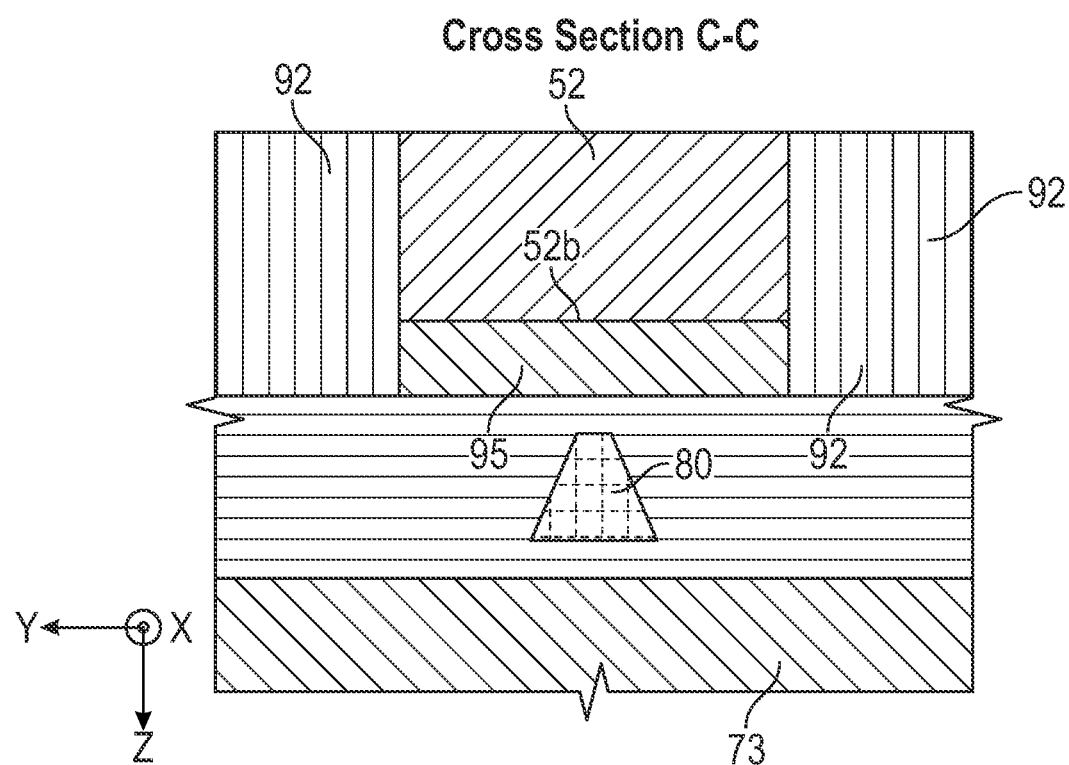

FIG. 4A is a sectional view of a HAMR head and FIGS. 4B and 4C are views of sections B-B and C-C, respectively, for illustrating the prior art full-film layer of plasmonic material. The full-film plasmonic layer 95 is located on the NFT-facing surface 52b of the main pole 52 and extends from the front edge at the GBS to the back edge 95a recessed from the GBS. As shown in FIG. 4A, the plasmonic layer 95 increases the spacing in the along-the track direction (the Z-axis) between the entirety of the main pole 52 and the NFT 74, which reduces the magnetic field intensity at the recording layer. As shown in FIG. 4C, because the plasmonic layer is a full-film that substantially covers the NFT-facing surface of the main pole, the cross-track width (the Y-direction) of the plasmonic layer 95 is the same as the cross-track width of the main pole 52.

In embodiments of this invention, the NFT-facing surface of the main pole has a recess that contains plasmonic material with a tip that is aligned with the NFT output tip in the along-the-track direction. When plasmonic material is added between the NFT and the main pole and the direction of light polarization is in the along-the-track direction (the Z-axis), image charges are induced in the plasmonic material in the recess which produces a localized optical near-field between the NFT and the main pole due to interaction between charges at the top of the NFT and the image charges. Because the optical near-field is localized in the gap between the plasmonic tip and the NFT output tip, the thermal gradient in the recording layer can be increased. The NFT-facing surface of the main pole that is not recessed is in contact with the thermal shunt, and the thermal shunt is also in contact with the plasmonic material in the recess. As a result, there is no increase in the spacing between the NFT and a large portion of the main pole. The cross-track width of the plasmonic tip at the GBS is equal to or less than the cross-track width of the widest portion of the NFT at the GBS, which heats the temperature of the NFT less than a plasmonic tip that has the same cross-track width as the main pole output tip.

Figure 5A:
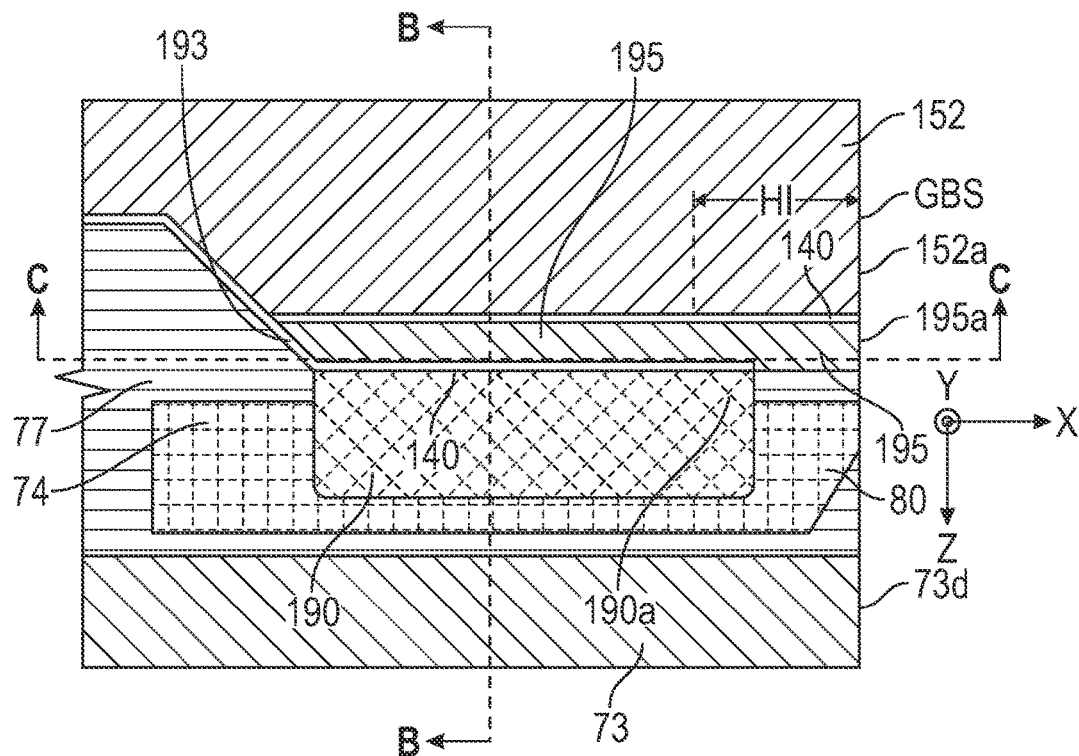
FIG. 5A is a sectional view of a HAMR head according to an embodiment of the invention.
Figure 5B:
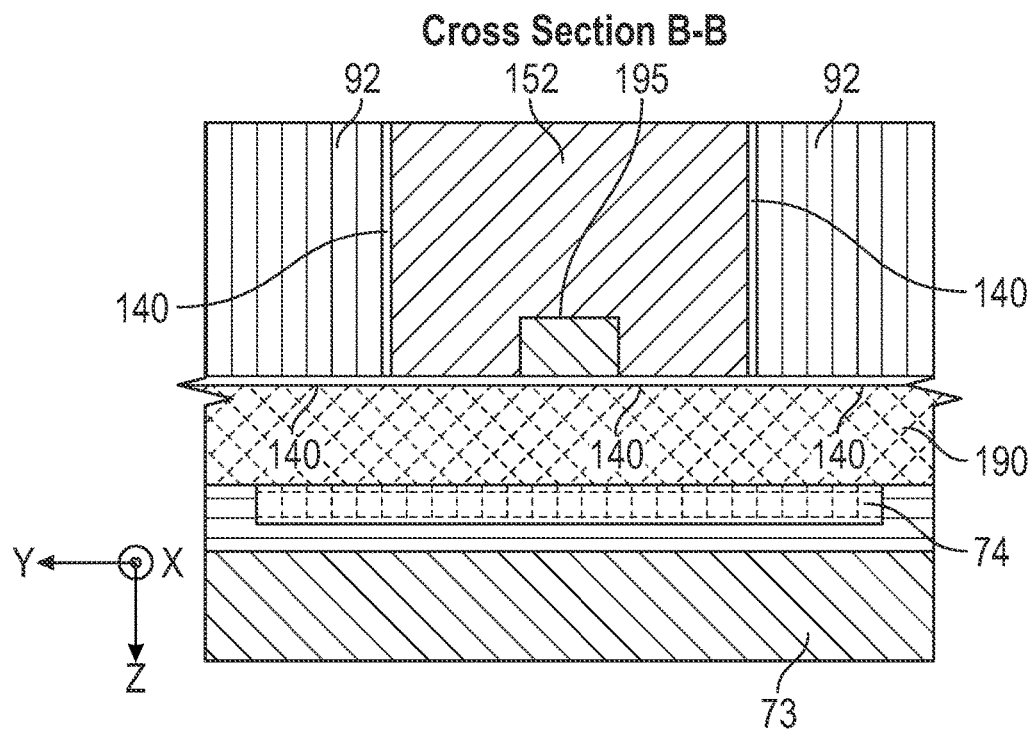
FIGS. 5B and 5C are views of sections B-B and C-C, respectively, of FIG. 5A.
Figure 5C:
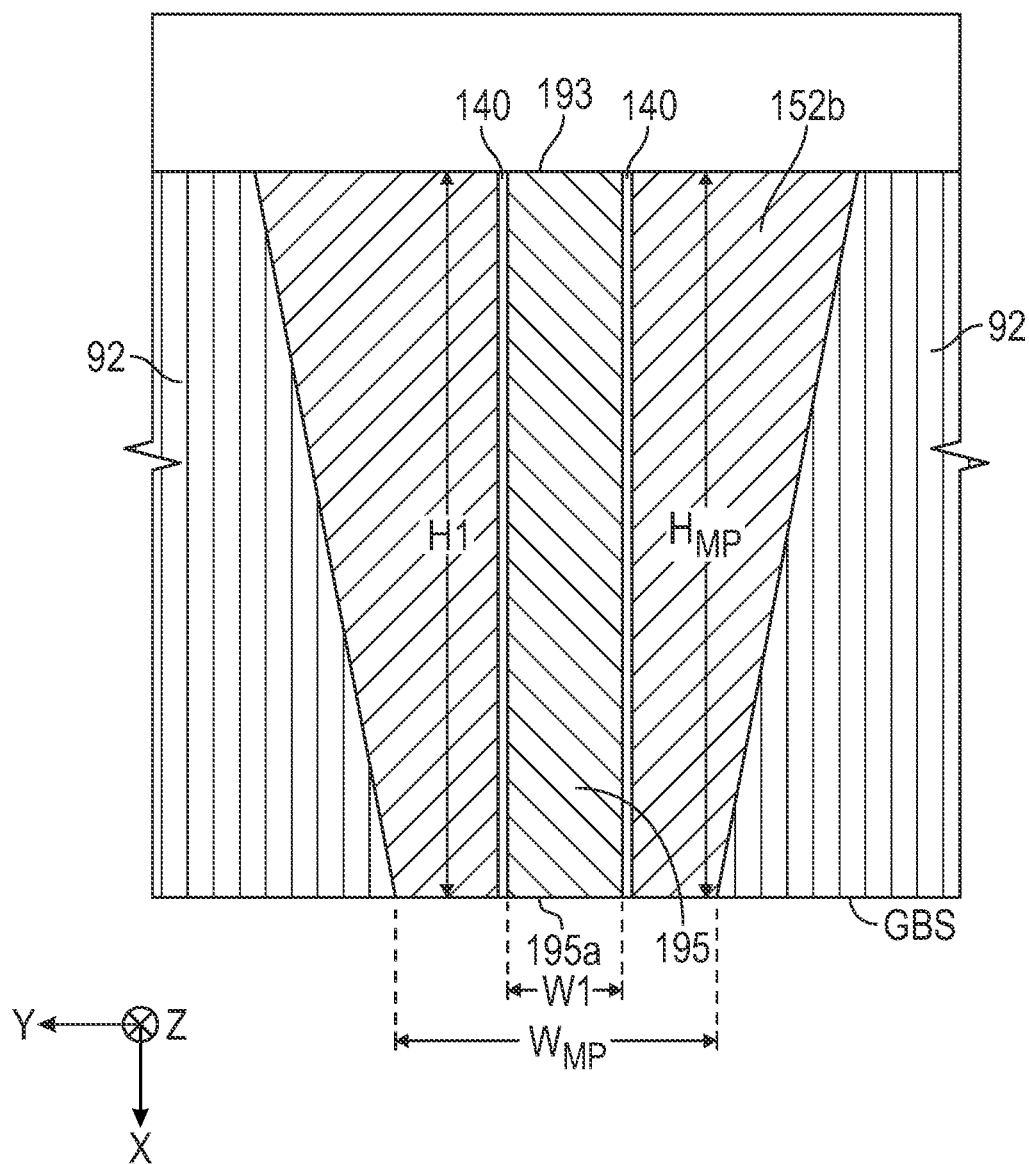
Figure 5D:
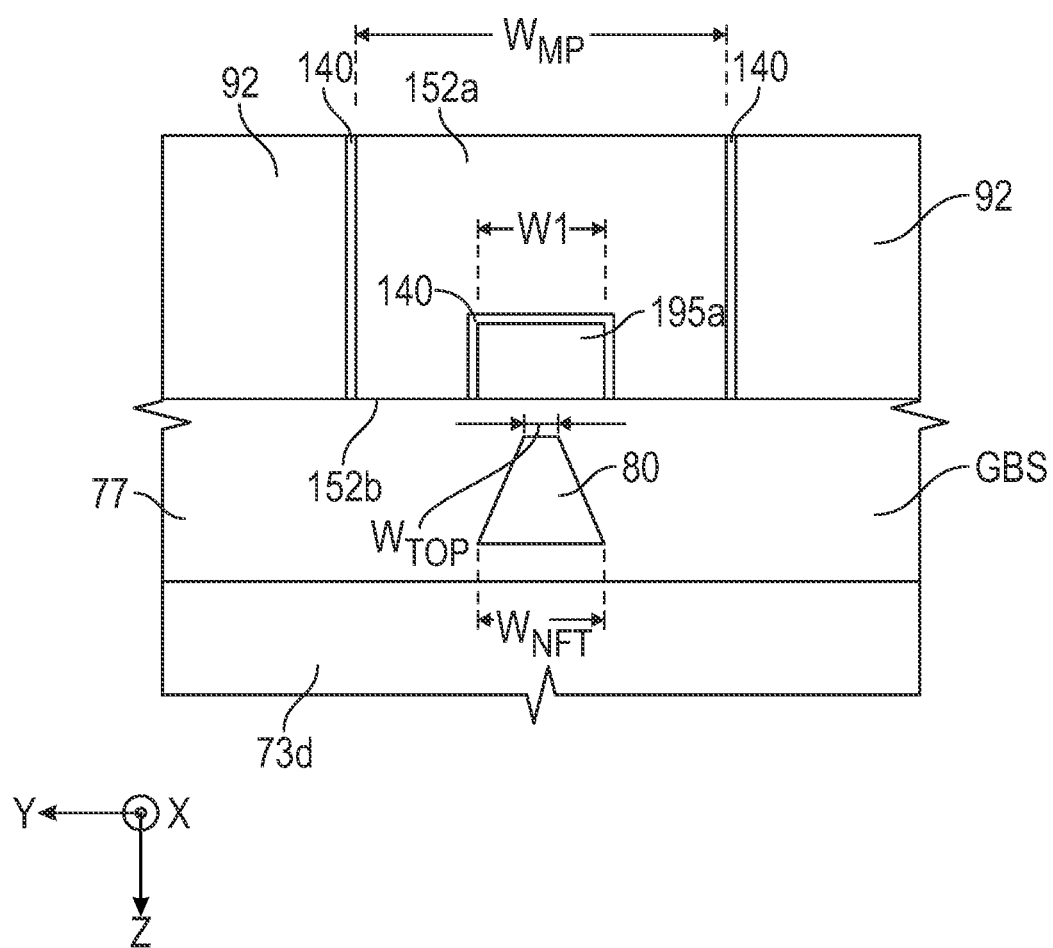
FIG. 5D is a view from the gas-bearing surface (GBS) of FIG. 5A.

FIG. 5A is a sectional view and FIG. 5B and FIG. 5C are views of sections B-B and C-C, respectively, of a HAMR head according to an embodiment of the invention. FIG. 5D is a view from the GBS of FIG. 5A and shows NFT output tip 80, waveguide core end 73d and surrounding cladding material 77. As shown in FIG. 5D, the NFT-facing surface 152b of main pole 152 has a recess 195 (FIGS. 5B-5C) that contains plasmonic material with a tip 195a at the GBS. The distance in the Z-direction between the main pole 152 and the NFT output tip 80 is large at the recess 195, but this distance at the sides of the recess can be smaller because the recess 195 has a narrow cross-track width (the Y-direction). This results in the magnetic field being larger than in the case with full-film plasmonic layer. In FIG. 5D, cross-track width W1 of tip 195a at the GBS is substantially less than the cross-track width $W_{MP}$ of the main pole at the GBS. $W_{MP}$ is typically between about 150 to 250 nm. The widest width of NFT output tip 80 substantially at the GBS is $W_{NFT}$ at the portion farthest in in Z-direction from the plasmonic recess tip 195a. $W_{NFT}$ is typically in the range of 50 to 150 nm. The narrowest width of the NFT output tip 80 substantially at the GBS is $W_{TOP}$ closest to the plasmonic recess tip 195a in the Z-direction. W1 is less than or equal to $W_{NFT}$ but can also be less than or equal to $W_{TOP}$. The track width of the recording is determined by the $W_{TOP}$, which has a typical width between about 20-40 nm. As shown in FIG. 5C, the plasmonic recess 195 can extend to back edge 193 to the full height of the NFT-facing surface and have a height H1 (the X-direction) substantially equal to the height of the main pole $H_{MP}$. The height H1 can also be selected to be any height less than or greater than $H_{MP}$. The width W1 is substantially constant over this height.

As shown in FIGS. 5A and 5C, a thin diffusion barrier 140 between the main pole 152 and the plasmonic material in recess 195 is required if the plasmonic material is Au or another material that may diffuse into the material of the main pole 152, which is typically a CoFe or CoFeNi alloy. The diffusion barrier 140 may also be located between the plasmonic material in the recess 195 and the thermal shunt 190, as shown in FIG. 5A, for preventing material diffusion between these layers if different materials are used. As shown in FIG. 5B, an optional thin diffusion barrier 140 may be located between the thermal shunt 190 and heat sink material 92. If the heat sink material is the same as the material of the thermal shunt or the plasmonic material then a diffusion barrier is not needed at those interfaces.

The plasmonic recess 195 may being formed of the same material as the materials that may be used for the thermal shunt, for example Au, Ag, Rh, Ir, Cu, Al, Be, Mo, and W, or their alloys, and is thus can be continuous with the material of the thermal shunt 190. This is preferred for ease of manufacture, but the plasmonic recess may be formed of a different material than the thermal shunt. Materials that may be used for the plasmonic recess include one or more of Au, Rh, Ir, Cu, Ag, Al, Ru, Cr, Pt, Ti, Fe, Co, Ni, Pd, Be, Mo, W and AlN and TiN alloys.

Figure 6A:
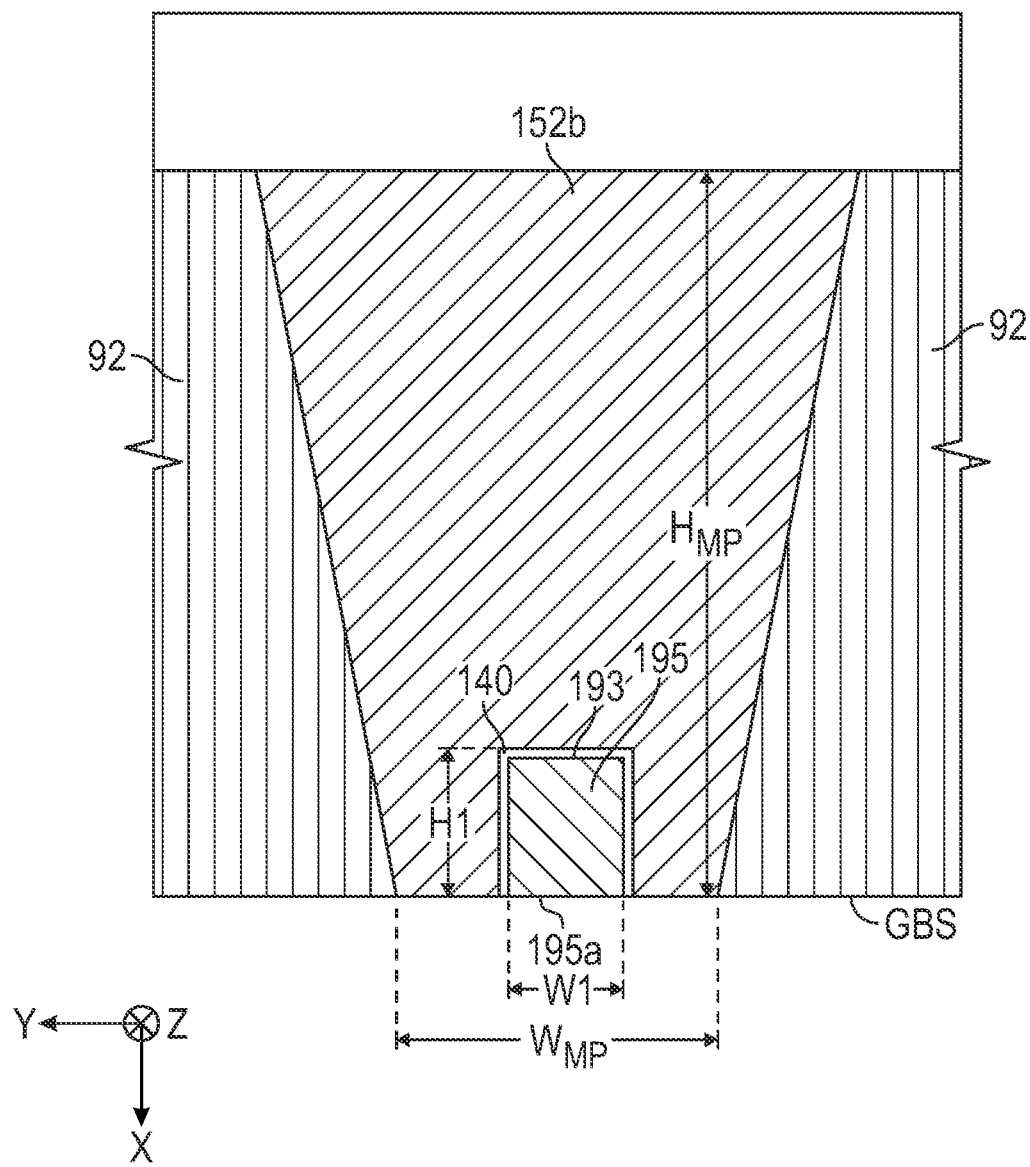
FIG. 6A is a view of the NFT-facing surface of the main pole of an embodiment of the invention where the plasmonic recess has a height that does not extend to the back end of the NFT-facing surface.

FIG. 6A is a view like FIG. 5C and shows an embodiment where the plasmonic recess 195 with tip 195a has a height H1 in the X-direction that is less than the full height of the NFT-facing surface and less than the height $H_{MP}$ of the main pole. By keeping H1 less than $H_{MP}$, the surface area of NFT-facing surface 152b is increased which increases the magnetic field intensity.

Figure 6B:
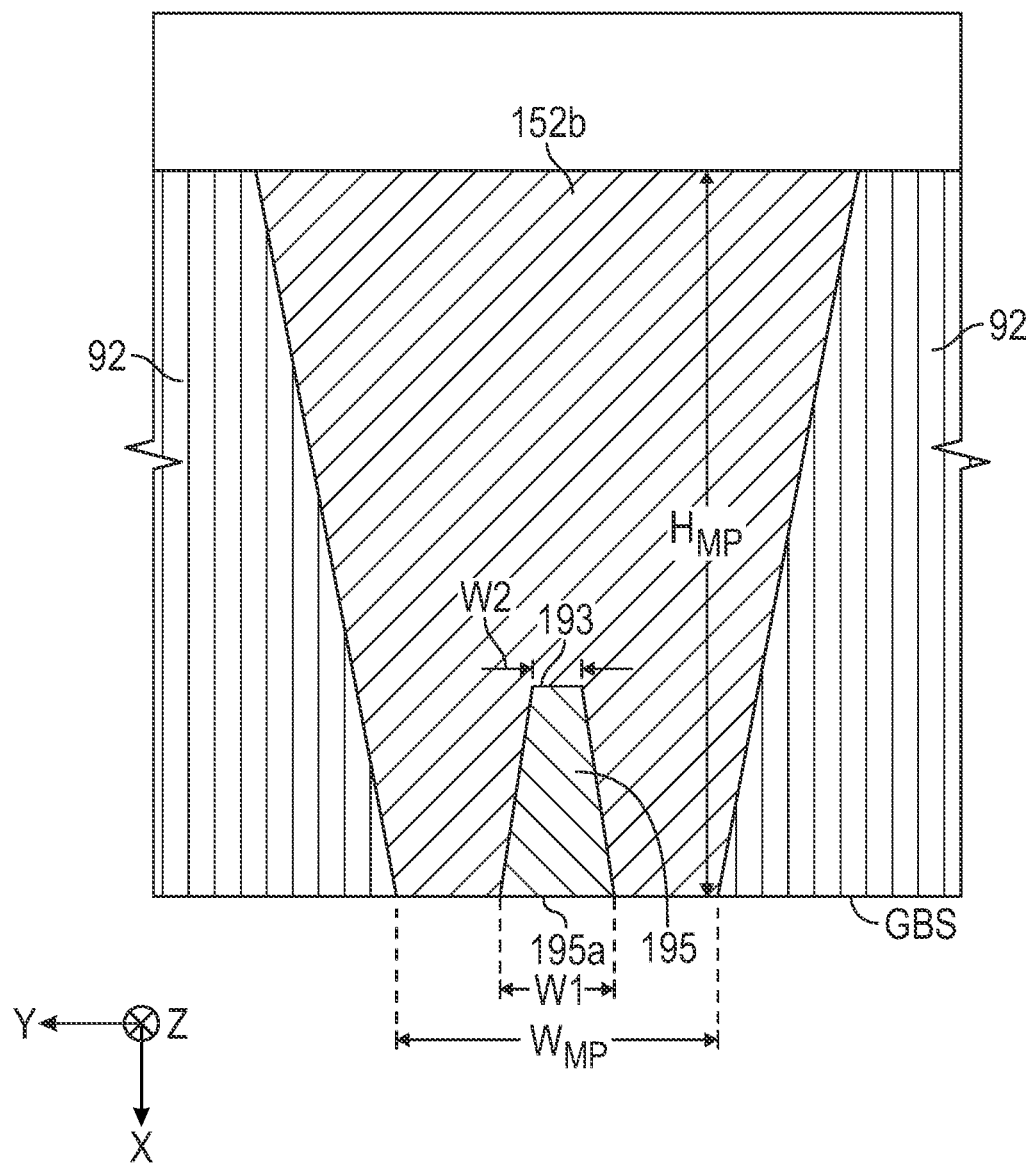
FIG. 6B is a view of the NFT-facing surface of the main pole of an embodiment of the invention showing the plasmonic recess with a back edge that has a cross-track width less than the cross-track width at the GBS.

FIG. 6B is a view like FIG. 6A but shown without diffusion barrier 140 for ease of illustration and shows an embodiment where the back edge 193 of plasmonic recess 195 has a cross-track width W2 that is less than W1, which can further increase the magnetic field intensity. If desired W2 can also be greater than W1.

Figure 6C:
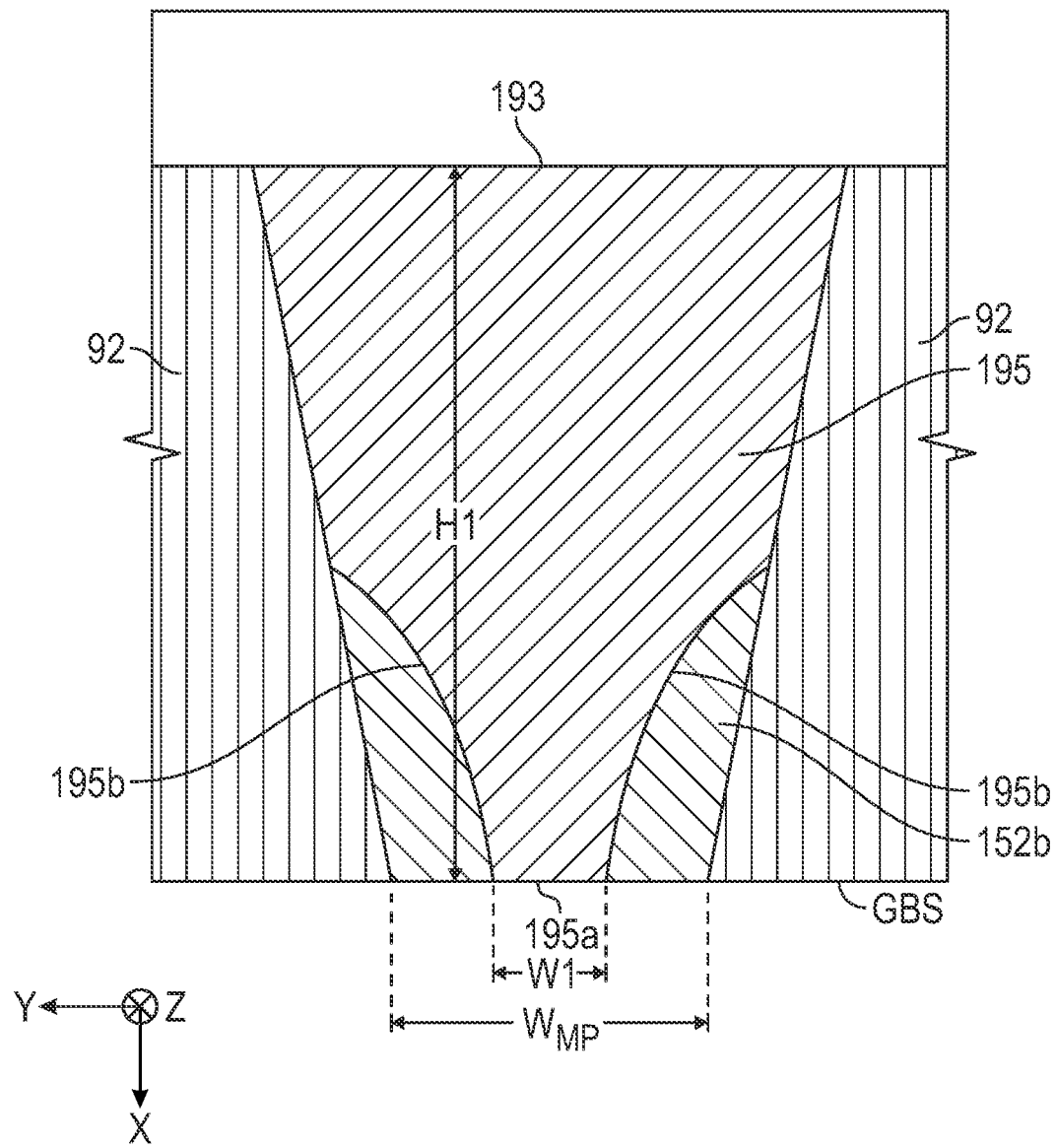
FIG. 6C is a view of the NFT-facing surface of the main pole of an embodiment of the invention showing the plasmonic recess with flared cross-track sides.

FIG. 6C is a view like FIG. 6A but shown without diffusion barrier 140 for ease of illustration and shows plasmonic recess 195 having flared cross-track sides 195b that results in a cross-track width that increases with distance from the GBS. By increasing the cross-track width with distance from the GBS, the heat from the thermal shunt (190 in FIG. 5A) to heat sink material 92 increases and the temperature of the NFT can be reduced. The shape of the flared sides 195b can be a continuous curve, as shown in FIG. 6C. Alternatively, the shape of the flared sides 195b can be a succession of straight lines or a straight line followed by a curve. The shape of the flared plasmonic recess may also be selected to match the shape of the NFT 74 (FIG. 5A).

Figure 7A:
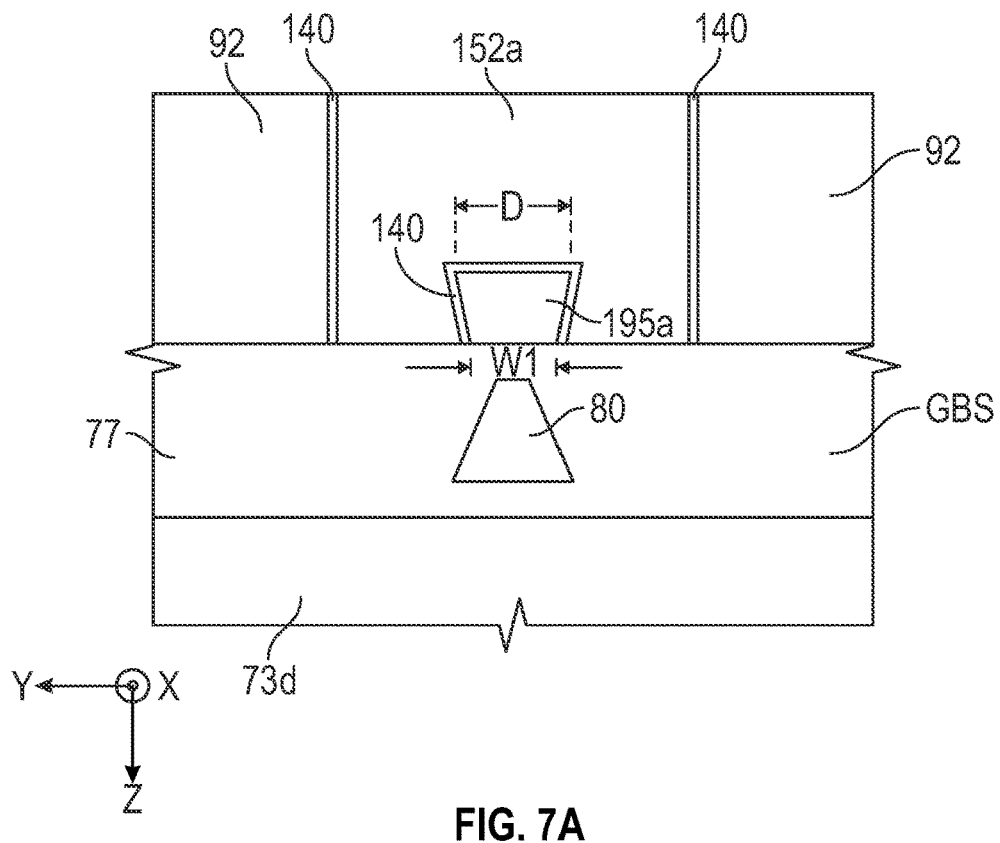
FIG. 7A is a GBS view of an embodiment of the invention where the cross-track width of the plasmonic recess increases in the along-the-track direction.

FIG. 7A is a GBS view like FIG. 5D and shows an embodiment where the cross-track width of the recess and thus the plasmonic tip 195a increases in the along-the-track direction (the Z-axis) away from the NFT output tip 80, as shown by D being greater than W1. By gradually increasing the cross-track width in this direction it has been shown by computer modeling that the thermal gradient can be increased. It is also possible to shape the plasmonic recess in this direction so that D is less than W1.

Figure 7B:
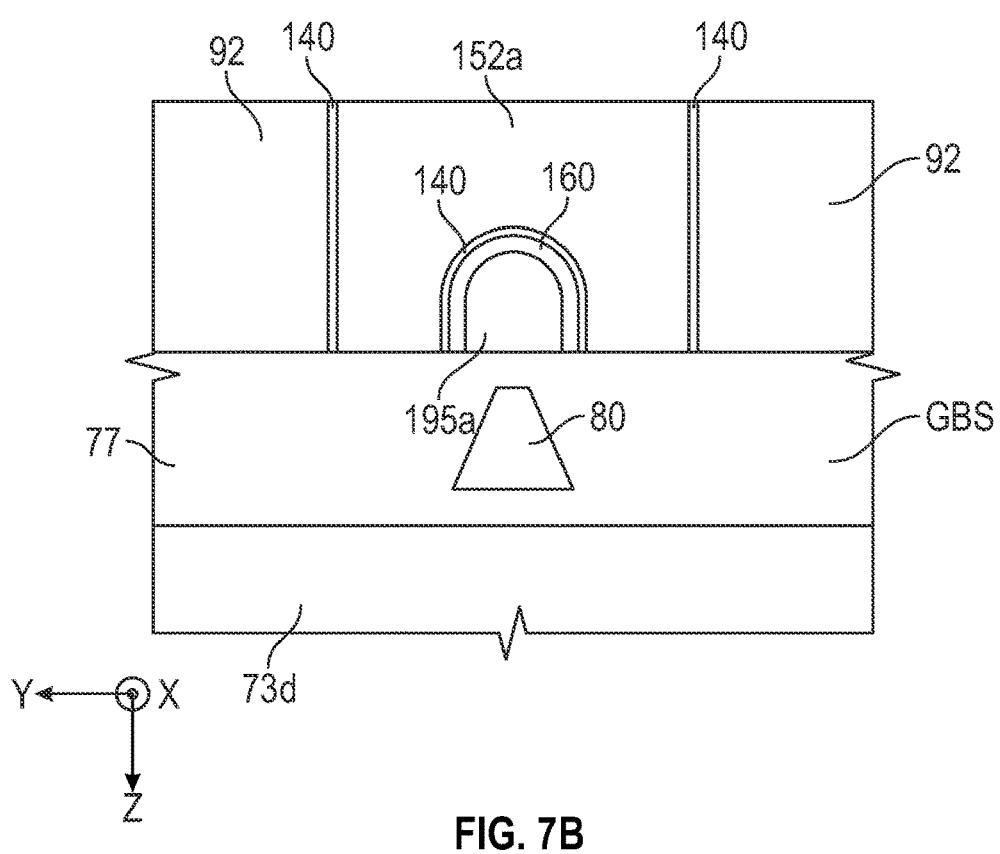
FIG. 7B is a GBS view of an embodiment of the invention where the plasmonic recess has a different shape in the along-the-track direction and with an optional layer of dielectric material.

FIG. 7B is a GBS view like FIG. 5D and shows an embodiment where the plasmonic recess can have different shapes in the along-the-track direction (the Z-axis) away from the NFT output tip 80, such as the rounded shape of plasmonic tip 195a. FIG. 7B also shows that there can be an optional layer 160 of dielectric material, like $SiO_2$, between the plasmonic material and the diffusion layer 140. The dielectric layer 160 reduces the heat from the NFT output tip 80 to the main pole, which will reduce the likelihood of oxidation of the main pole.

Figure 7C:
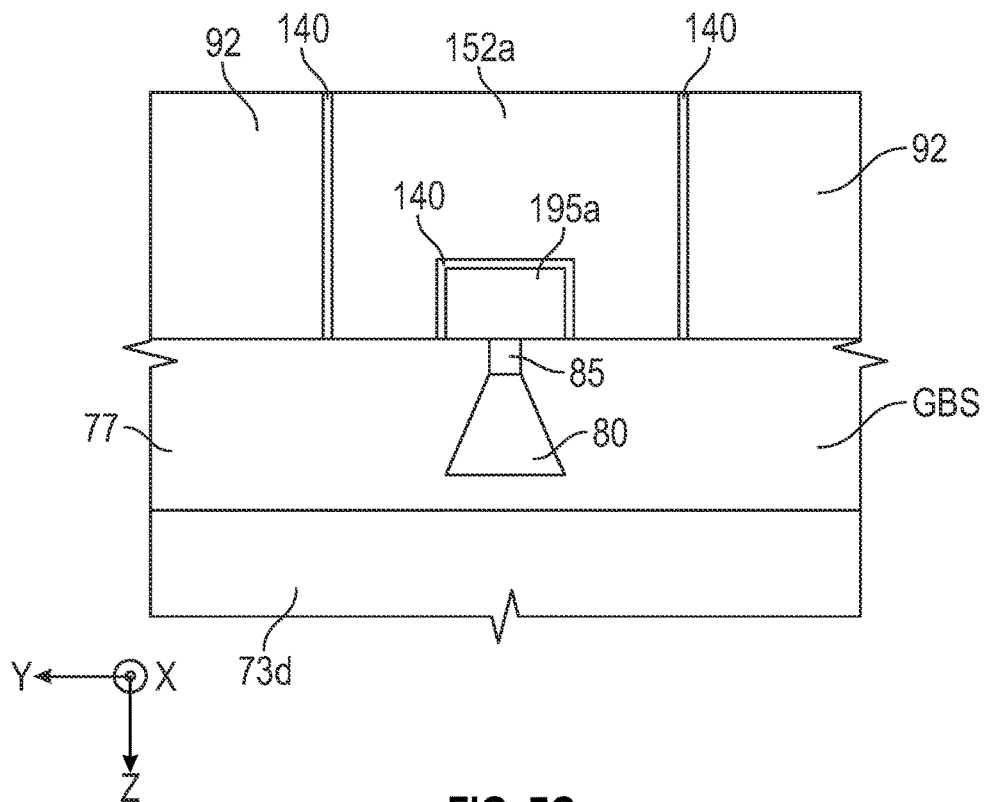
FIG. 7C is a GBS view of an embodiment of the invention showing gap material between the plasmonic tip and the NFT.

FIG. 7C is a GBS view like FIG. 5D and shows an embodiment where the gap material 85 between plasmonic tip 195a and NFT output tip 80 is formed of a different material than cladding material 77. The gap material 85 is shown as having the cross-track width substantially the same as the cross-track width of the narrowest portion of the NFT output tip 80, but it can have a cross-track width greater than cross-track width of the of the gap or the plasmonic tip 195a. Materials that can be used for the gap material 85 include $TiO_2$, $Ta_2O_5$, $Al_2O_3$, $Y_2O_3$, $MgF_2$, MgO, SiN, SiC and AlN. A lower refractive index material like $MgF_2$ can improve the optical efficiency and reduce the laser power and NFT temperature. A higher refractive index material like $TiO_2$ or $Ta_2O_5$ can reduce the reflectance of the NFT, which can reduce mode hop of the laser. A material with a higher thermal conductivity like AlN can reduce the NFT temperature.

Figure 8:
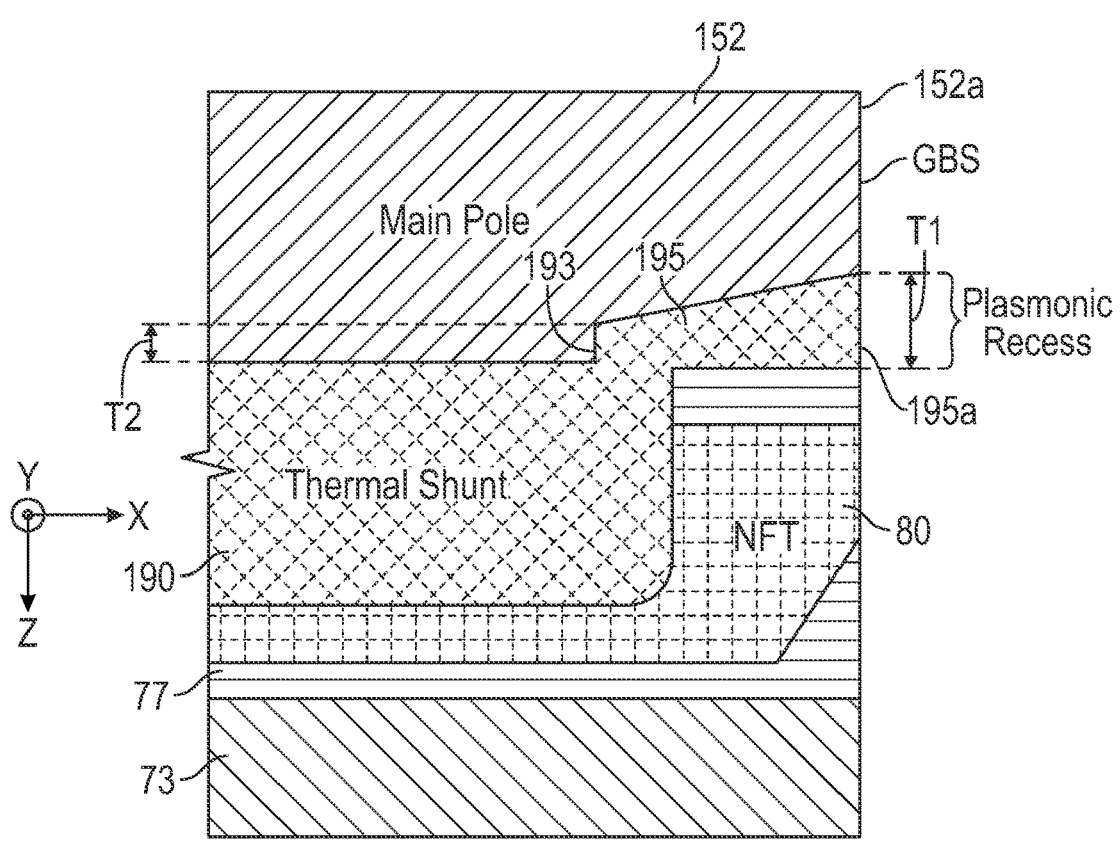
FIG. 8 is a side sectional view of an embodiment of the invention showing the plasmonic recess having a varying thickness in the along-the-track direction.

The plasmonic recess 195 may also be formed with a varying thickness in the along-the-track direction (the Z-axis), as shown in FIG. 8. In FIG. 8, the thickness increases gradually and is essentially a linear change from T2 at the back edge 193 to T1 at the GBS. The varying-thickness plasmonic recess can be designed with T1 greater than or less than T2. By varying the thickness at the back edge or the GBS, the magnetic field intensity at the recording point can be adjusted.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat assisted magnetic recording (HAMR) head assembly for writing to a magnetic recording layer comprising:
   a head having a recording layer facing surface, an along-the-track axis and a cross-track axis substantially orthogonal to the along-the-track axis;
   a near-field transducer (NFT) layer on the head on a surface substantially orthogonal to the recording layer facing surface and having an NFT tip substantially at the recording-layer-facing surface with a cross-track width;
   a main pole on the head, the main pole having a recording layer facing surface with an output end and a NFT-facing surface substantially orthogonal to and having a height from the recording-layer-facing surface, the NFT-facing surface having a recess containing plasmonic material, the plasmonic material including a plasmonic tip at the main pole output end aligned with the NFT tip in the along-the-track direction and with a cross-track width equal to or less than the cross-track width of the NFT tip; and
   an optical waveguide on the head and optically coupled to the NFT layer.

2. The HAMR head assembly of claim 1 wherein the height of the plasmonic recess in a direction orthogonal to the recording-layer-facing surface is substantially equal to or less than the height of the NFT-facing surface.

3. The HAMR head assembly of claim 2 wherein the cross-track width of the plasmonic recess is substantially constant along its height.

4. The HAMR head assembly of claim 1 wherein the cross-track width of the plasmonic recess in a region away from the plasmonic tip is either less than or greater than the cross-track width of the plasmonic tip.

5. The HAMR head assembly of claim 1 wherein the cross-track width of the plasmonic recess in a region away from the plasmonic tip is greater than the cross-track width of the plasmonic tip and is flared from the plasmonic tip to said region away from the plasmonic tip.

6. The HAMR head assembly of claim 1 wherein the cross-track width of the plasmonic tip either increases or decreases from a region near the NFT tip to a region away from the NFT tip in the along-the-track direction.

7. The HAMR head assembly of claim 1 wherein the plasmonic material comprises one or more of Au, Rh, Ir, Cu, Ag, Al, Ru, Cr, Pt, Ti, Fe, Co, Ni, Pd, Be, Mo, W, AlN alloy and TiN alloy.

8. The HAMR head assembly of claim 1 further comprising a diffusion barrier between the main pole and the plasmonic material in the recess.

9. The HAMR head assembly of claim 1 further comprising a layer of dielectric material between the main pole and the plasmonic material in the recess.

10. The HAMR head assembly of claim 1 further comprising a layer of gap material between the plasmonic tip and the NFT, the gap material selected from TiO2, Ta2O5, Al2O3, Y2O3, MgF2, MgO, SiN, SiC and AlN.

11. The HAMR head assembly of claim 1 further comprising a thermal shunt between the NFT layer and the NFT-facing surface of the main pole, wherein the thermal shunt is in contact with the plasmonic material.

12. The HAMR head assembly of claim 10 wherein the thermal shunt is formed of the same material as the plasmonic material.

13. A heat assisted recording (HAMR) disk drive comprising:
the HAMR head assembly of claim 1 further comprising a magnetoresistive read head;
a laser for directing light to the waveguide; and
a magnetic recording disk having a magnetic recording layer.

14. A heat assisted magnetic recording (HAMR) head assembly for writing to a magnetic recording layer comprising:
a gas-bearing slider having a gas-bearing surface (GBS), an along-the-track axis and a cross-track axis substantially orthogonal to the along-the-track axis;
a near-field transducer (NFT) layer on the slider on a surface substantially orthogonal to the GBS and having an output tip substantially at the GBS;
a main pole on the slider, the main pole having a NFT-facing surface substantially parallel to the NFT layer and an output end at the GBS aligned with the NFT output tip in the along-the-track direction, the NFT-facing surface having a recess containing plasmonic material, the plasmonic recess having a front edge at the GBS and a back edge away from the GBS, wherein the plasmonic recess front edge has a cross-track width equal to or less than the cross-track width of the NFT output tip;
a thermal shunt between the NFT layer and the NFT-facing surface of the main pole, wherein the thermal shunt is in contact with the back portion of the plasmonic recess near the back edge; and
an optical waveguide on the slider and optically coupled to the NFT layer.

15. The HAMR head assembly of claim 14 wherein the height of the plasmonic recess from the front edge to the back edge is substantially equal to or less than the height of the NFT-facing surface.

16. The HAMR head assembly of claim 14 wherein the cross-track width of the plasmonic recess is substantially constant along its height from the front edge to the back edge.

17. The HAMR head assembly of claim 14 wherein the cross-track width of the plasmonic material in a region away from the plasmonic recess front edge is either less than or greater than the cross-track width of the plasmonic recess front edge.

18. The HAMR head assembly of claim 14 wherein the cross-track width of the plasmonic recess in a region away from the plasmonic recess front edge is greater than the cross-track width of the front edge and is flared from the front edge to said region away from the front edge.

19. The HAMR head assembly of claim 14 wherein the cross-track width of the plasmonic recess front edge either increases or decreases from a region near the NFT tip to a region away from the NFT tip in the along-the-track direction.

20. The HAMR head assembly of claim 14 wherein the along-the-track thickness of the plasmonic recess in a region away from the plasmonic recess front edge is either less than or greater than the along-the-track thickness of the plasmonic recess front edge.

21. The HAMR head assembly of claim 14 wherein the plasmonic material comprises one or more of Au, Rh, Ir, Cu, Ag, Al, Ru, Cr, Pt, Ti, Fe, Co, Ni, Pd, Be, Mo, W, AlN alloy and TiN alloy.

22. The HAMR head assembly of claim 14 further comprising a diffusion barrier between the main pole and the plasmonic material in the recess.

23. The HAMR head assembly of claim 14 further comprising a layer of dielectric material between the main pole and the plasmonic material in the recess.

24. The HAMR head assembly of claim 14 further comprising a layer of gap material between the plasmonic tip and the NFT, the gap material selected from TiO2, Ta2O5, Al2O3, Y2O3, MgF2, MgO, SiN, SiC and AlN.

25. The HAMR head assembly of claim 14 wherein the thermal shunt is formed of the same material as the plasmonic material.

26. A heat assisted recording (HAMR) disk drive comprising:
the HAMR head assembly of claim 14 further comprising a magnetoresistive read head on the head carrier;
a laser for directing light to the waveguide; and
a magnetic recording disk having a magnetic recording layer.

* * * * *